No. 876,383.
PATENTED JAN. 14, 1908.
J. MURGAS.
MEANS FOR PRODUCING ELECTROMAGNETIC WAVES.
APPLICATION FILED JAN. 4, 1905. RENEWED NOV. 26, 1907.
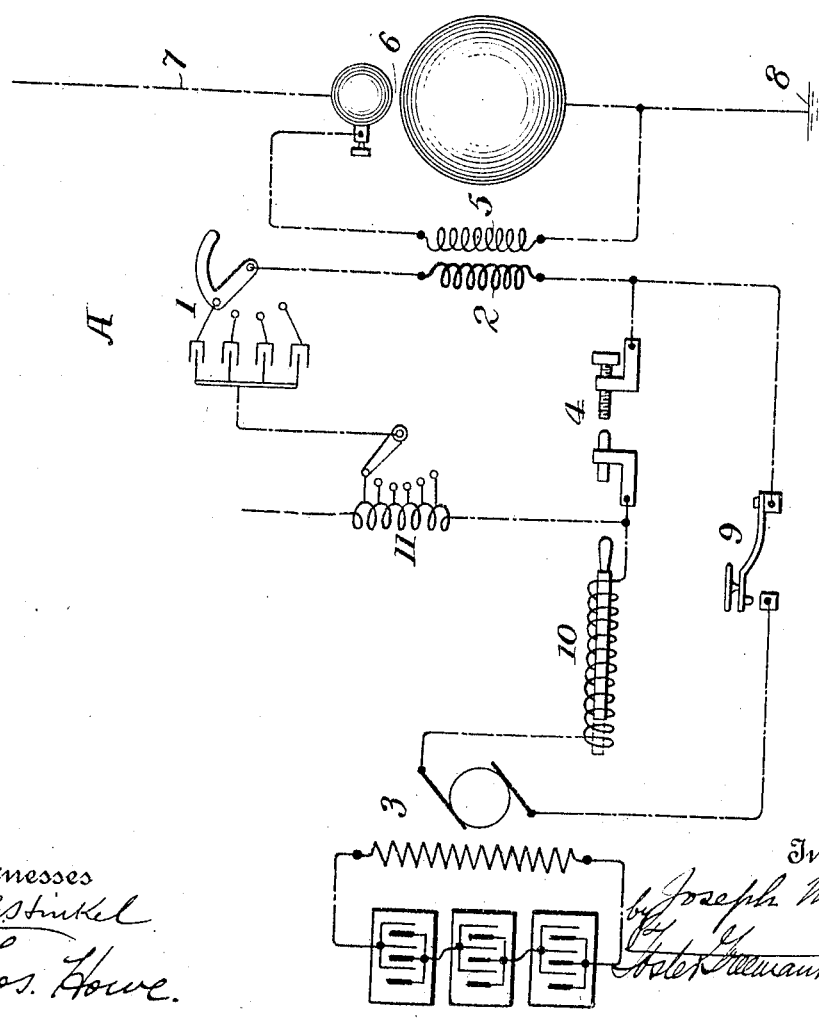
Witnesses
J. G. Stinkel
Thos. Howe.
Inventor
Joseph Murgas
by
Foster Freeman and Wilson
Attorneys

UNITED STATES PATENT OFFICE.

JOSEPH MURGAS, OF WILKES-BARRE, PENNSYLVANIA.

MEANS FOR PRODUCING ELECTROMAGNETIC WAVES.

No. 876,383.   Specification of Letters Patent.   Patented Jan. 14, 1908.

Application filed January 4, 1905, Serial No. 239,632. Renewed November 26, 1907. Serial No. 403,904.

*To all whom it may concern:*

Be it known that I, JOSEPH MURGAS, a citizen of the United States, residing at Wilkes-Barre, in the county of Luzerne, State of Pennsylvania, have invented certain new and useful Improvements in Means for Producing Electromagnetic Waves, of which the following is a specification.

This invention relates to improvements whereby electro-magnetic waves such as are employed for the transmission of intelligence without wires may be produced, but it may have other applications than in wireless telegraphy, notably in X-ray and other processes which are dependent for their operation upon disturbances in the ether.

The invention can be best described in connection with the accompanying drawing which is a diagrammatic illustration of the invention as applied to wireless telegraphy.

The transmitting apparatus A comprises a circuit including a condenser 1 and the primary 2 of a transformer. A suitable source of electrical energy 3 is adapted to energize the circuit referred to and across the terminals of the circuit is connected a spark gap 4. The voltage of the generator is sufficient to cause the current to lap the spark gap 4. The source of energy may, in the present instance, comprise a direct current generator having an armature and field as shown and the field may be energized by suitable storage batteries also shown. The secondary 5 of the transformer is connected in another circuit which includes a spark gap 6, the terminals of which are respectively connected to the antenna 7 and the earth 8. A key 9 provides means for connecting the source of energy with the condenser circuit. If now the source of energy be connected with the condenser circuit, the condensers will become charged and the equilibrium of the circuit established. The apparatus, however, is so chosen and arranged that at this moment a spark will leap across the gap 4 thus disturbing the equilibrium of the condenser circuit and causing the condensers to discharge. As is well known, the discharge of a condenser is oscillatory in its character and the vibrating or oscillating current thus set up in the condenser circuit is transmitted through the transformer to the spark gap 6 at which a succession of sparks occur. In circuit with the generator may be inserted an adjustable reactance 10 which serves to produce inductive voltage which tends to oppose change in the current flow. As is well understood in the art, a reactance or inductance coil is one the reactance of which is high compared with its resistance.

It is necessary for successful operation that the condenser circuit and the secondary circuit should be syntonized and to adjust them to syntony an adjustable inductance 11 in series with the condenser and primary of the transformer is provided. The spark gap 4 is preferably adjustable as shown and the condenser 1 may also be made adjustable.

The invention is based upon the fact that the continuity of the arc, which would otherwise be formed and maintained across the spark gap 4, by the source 3 and the inductance 10, is broken up by the oscillatory discharge of the condenser and the discharge across the spark gap becomes periodic. For a given capacity of condenser the spark frequency decreases with an increase of the inductive resistance 10 while with a given inductive resistance 10 the spark frequency increases if the capacity of the condenser 1 is made smaller. It will thus be seen that by regulating the inductance 10 or the condenser 1 or both, the spark frequency can be readily regulated and the condenser circuit may be maintained in syntonism with the secondary circuit by adjusting the inductance 11 to correspond with the variations in the capacity of the condenser. Neither the inductance 11 nor the transformer have iron cores.

Among the advantages therefore of this invention may be mentioned the facts that the usual interrupter is dispensed with, the interruptions of the current occurring spontaneously, the spark frequency can be readily regulated as before described and the oscillating current produced is readily susceptible of transformation into currents of different potential and frequency.

Let it be assumed that the inductance 10, condenser 1, have been set to produce the desired spark frequency and that the inductance 11 has been so adjusted as to bring the condenser circuit into syntonism with the secondary circuit. If now the key 9 be closed, the condenser will become charged and upon its voltage reaching a certain potential a spark will leap across the gap 4 when the condenser will discharge with the characteristic oscillatory current, whereupon the potential of the current falls thereby destroying the spark across the gap 4 which is reëstablished upon the condensers attaining the striking potential. The oscillatory currents thus set up are transmitted through the transformer to the spark gap 6 and the sparks caused at the latter gap produce electro-magnetic waves which are transmitted to the receiving station where they are made manifest in a well known manner.

While I have illustrated my invention in what I consider its best application, it may be embodied in other constructions without departing from the spirit of the invention, and the invention should not, therefore, be limited to the construction shown.

Having thus described the invention, what is claimed is:—

In a means for producing electro-magnetic waves, the combination with a spark gap, of an adjustable condenser, an adjustable inductance, means for adjusting said condenser at will, means for adjusting said inductance at will, a transformer, the primary of said transformer, said inductance and said condenser being connected in series across said spark gap, a second spark gap, an antenna operatively associated therewith, said second spark gap being connected in series with the secondary of said transformer, a direct current source, a second inductance means for varying said second inductance at will, and a key and connections adapted to connect the said second inductance and the said source in series across the first mentioned spark gap, substantially as described.

In testimony whereof I have signed my name to this specification in the presence of two subscribing witnesses.

JOSEPH MURGAS.

Witnesses:
   W. L. RAEDER,
   E. C. RAEDER.